US012421140B1

(12) United States Patent
Mohammad et al.

(10) Patent No.: US 12,421,140 B1
(45) Date of Patent: Sep. 23, 2025

(54) INTEGRATED ELECTROCOAGULATION DESALINATION PROCESS WITH CARBON DIOXIDE CAPTURE AND SOLID RECOVERY

(71) Applicant: United Arab Emirates University, Al Ain (AE)

(72) Inventors: Ameera Mohammad, Al Ain (AE); Ali Al Marzouqi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/999,666

(22) Filed: Dec. 23, 2024

(51) Int. Cl.
  *B01D 53/32* (2006.01)
  *B01D 53/62* (2006.01)
  (Continued)

(52) U.S. Cl.
  CPC ............ *C02F 1/463* (2013.01); *B01D 53/326* (2013.01); *B01D 53/62* (2013.01); *B01D 53/78* (2013.01);
  (Continued)

(58) Field of Classification Search
  CPC ............ C02F 1/463; C02F 2001/46133; C02F 2001/46152; C02F 2101/20; C02F 2103/08; C02F 2201/46155; C02F 2201/4619; C02F 1/001; C02F 1/004; C02F 1/444; C02F 2201/46105; C02F 2201/4611;
  (Continued)

(56) References Cited

U.S. PATENT DOCUMENTS 11,453,951 B1 * 9/2022 Mohammad ............ C01C 1/026
11,814,309 B1 * 11/2023 Mohammad ............ C01F 5/20
(Continued)

OTHER PUBLICATIONS

Jawad Mustafa, "Simultaneous treatment of reject brine and capture of carbon dioxide: A comprehensive review", published in Desalination, vol. 483, Mar. 9, 9, 2020. (Year: 2020).*

(Continued)

*Primary Examiner* — Joseph W Drodge
(74) *Attorney, Agent, or Firm* — MH2 Technology Law Group, LLP

(57) ABSTRACT

An electrocoagulation (EC) reactor and method for simultaneous $CO_2$ capture and brine desalination. The EC reactor includes a reaction chamber that holds brine solution with contaminants, an inlet tube for $CO_2$ gas mixture supply, and a plurality of electrodes (130), submerged in the brine. The electrodes are connected to a power source, applying a voltage to induce electrochemical reactions that precipitate dissolved salts and heavy metals, reducing brine salinity and contaminants, while capturing $CO_2$ in the form of carbonates to form solid coagulants. The method involves introducing brine into the EC reactor's reaction chamber, adding calcium oxide (CaO) and ammonium bicarbonate ($NH_4HCO_3$) to create a homogeneous solution, and applying electric current to dissolve the electrodes, producing solid coagulants. A $CO_2$ gas mixture is introduced to facilitate carbonation reactions, forming precipitates like calcium carbonate ($CaCO_3$) and magnesium carbonate ($MgCO_3$), which are filtered to obtain desalinated brine.

8 Claims, 14 Drawing Sheets

(51) Int. Cl.
*B01D 53/78* (2006.01)
*C02F 1/46* (2023.01)
*C02F 1/463* (2023.01)
*C02F 1/461* (2023.01)
*C02F 101/20* (2006.01)
*C02F 103/08* (2006.01)

(52) U.S. Cl.
CPC .......... *B01D 2251/2065* (2013.01); *B01D 2251/402* (2013.01); *B01D 2251/404* (2013.01); *B01D 2251/602* (2013.01); *B01D 2251/606* (2013.01); *C02F 2001/46133* (2013.01); *C02F 2001/46152* (2013.01); *C02F 2101/20* (2013.01); *C02F 2103/08* (2013.01); *C02F 2201/46155* (2013.01); *C02F 2201/4619* (2013.01)

(58) Field of Classification Search
CPC ...... B01D 53/326; B01D 53/62; B01D 53/78; B01D 2251/2065; B01D 2251/402; B01D 2251/404; B01D 2251/602; B01D 2251/606; B01D 19/0084; B01D 36/00; B01D 37/00; B01D 53/32; B01D 61/04; B01D 2251/304; B01D 2311/2603; C01D 7/18; C01D 7/34; C01F 5/24; C01F 11/18; C01F 11/181; C01F 11/182; C01F 11/184; C25B 1/14; C25B 1/18; B01J 19/0013; B01J 19/0053; B01J 19/0066; B01J 19/0073; B01J 19/24; B01J 19/2415; B01J 19/244; B01J 4/001; B01J 4/004; B01J 2219/00074; B01J 2219/00087; B01J 2219/00094; B01J 2219/00475; B01J 2219/0059; B01J 2219/00599; B01J 2219/0807; B01J 2219/0809; B01J 2219/0824; B01J 2219/0826; B01J 2219/0835; B01J 2219/0837; B01J 2219/2469; B01J 2219/247

See application file for complete search history.

(56) References Cited

U.S. PATENT DOCUMENTS

| | | | | |
|---|---|---|---|---|
| 12,168,615 | B1* | 12/2024 | Mohammad | C02F 1/283 |
| 2005/0224338 | A1* | 10/2005 | Kin | C02F 1/463 |
| | | | | 204/230.2 |
| 2006/0021942 | A1* | 2/2006 | Bradley | B01D 17/06 |
| | | | | 210/663 |
| 2011/0214535 | A1* | 9/2011 | Vandor | F25J 1/004 |
| | | | | 423/244.01 |
| 2013/0180400 | A1* | 7/2013 | Iwamoto | B01D 53/62 |
| | | | | 261/74 |
| 2014/0216946 | A1* | 8/2014 | Milner | C02F 1/24 |
| | | | | 210/639 |
| 2014/0253449 | A1* | 9/2014 | Bochniak | G06F 3/03543 |
| | | | | 345/163 |
| 2021/0253449 | A1* | 8/2021 | Katz | C02F 1/441 |
| 2025/0171332 | A1* | 5/2025 | Thiers | B08B 3/08 |

OTHER PUBLICATIONS

Olawale Oloye, Electrochemical Capture and Storage of CO2 as Calcium Carbonate, ChemSusChem, 2021, vol. 14, pp. 1767-1775. (Year: 2021).*

* cited by examiner

INTEGRATED ELECTROCOAGULATION DESALINATION PROCESS WITH CARBON DIOXIDE CAPTURE AND SOLID RECOVERY

TECHNOLOGICAL FIELD

The present disclosure in general relates to the field of environmental and chemical engineering. The present disclosure is further directed towards an electrocoagulation reactor and a desalination process for brine treatment, carbon dioxide ($CO_2$) capture, and the recovery of solid materials.

BACKGROUND

The information in this section merely provides background information related to the present disclosure and may not constitute prior art(s) for the present disclosure.

An increase in atmospheric carbon dioxide ($CO_2$) levels is a pressing environmental challenge, largely driven by activities such as burning fossil fuels and industrial processes. $CO_2$, the primary greenhouse gas, significantly contributes to global warming and climate change. Power plants are a major source of $CO_2$ emissions, and while various sequestration methods exist—such as geological storage, ocean disposal, and reforestation-they often face limitations like high costs, environmental risks, and inefficiencies. An emerging alternative solution involves using $CO_2$ in industrial processes to create solid products, such as carbonate materials. This approach not only reduces $CO_2$ levels but also provides practical and economic benefits, making it a desirable solution for reducing greenhouse gas emissions.

At the same time, the disposal of brine solution after the desalination process presents another environmental issue. Brine, a byproduct of desalination, is highly saline in nature and often contains harmful contaminants, including metals such as Calcium, Magnesium, Copper, etc. Improper disposal of brine solution can harm ecosystem, particularly in regions heavily reliant on desalinated water. Conventional brine management methods, such as deep well injection and evaporation ponds, are either costly, energy-intensive, or environmentally damaging. Consequently, a growing focus has been on processes that treat brine while recovering solid material. For instance, certain methods react $CO_2$ with brine to extract useful salts, offering dual benefits of $CO_2$ utilization and brine management. However, implementing these processes efficiently and at scale remains a challenge.

Electrocoagulation (EC) is emerging as a promising technology to tackle these problems. EC operates by applying an electric current to water, causing the dissolution of metal electrodes (usually aluminum or iron) to release ions that adsorb onto contaminants, facilitating their removal. EC is also effective in reducing salinity, removing harmful metals, and recovering valuable ions like magnesium and calcium, present in the brine solution. Moreover, EC has shown potential for capturing $CO_2$. The process generates metal hydroxides that react with $CO_2$ to form stable carbonates like calcium carbonate ($CaCO_3$). This not only separates $CO_2$ but also improves water quality by reducing its acidity and promoting further $CO_2$ absorption.

By reducing brine contaminants and capturing $CO_2$ in solid forms, this method can help turn waste into valuable resources. Despite its potential, challenges such as electrode corrosion and scaling for industrial use remain. However, with further optimization, EC holds the promise of being a cost-effective, environmentally friendly solution for regions dealing with high $CO_2$ emissions and desalination byproducts.

Present disclosure is directed to overcome one or more limitations stated above or any other limitations associated with the known arts.

GENERAL DESCRIPTION

One or more shortcomings of the prior art are overcome by a device and a method as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns an electrocoagulation (EC) reactor. The electrocoagulation (EC) reactor comprises a reaction chamber being adapted to contain a brine solution with contaminants. The EC reactor further comprises an inlet tube positioned in the reaction chamber. The inlet tube is configured to supply carbon dioxide ($CO_2$) gas into the brine solution contained in the reaction chamber. A plurality of electrodes, comprising at least one first electrode and at least one second electrode, are positioned in the reaction chamber such that at least a portion of the at least one first electrode and at least one second electrode is submerged in the brine solution. The at least one first electrode and at least one second electrode being connectable to a power source for delivering a voltage across the at least one first electrode and at least one second electrode to facilitate electrochemical reactions and electrocoagulation. The electrocoagulation process precipitates dissolved salts and heavy metals in the brine solution reducing brine salinity and contaminant load while capturing $CO_2$ in the form of carbonates to form solid coagulants.

According to a configuration of the first aspect, the EC reactor comprises a cooling chamber surrounding the reaction chamber. The cooling chamber being configured to contain a cooling fluid to regulate temperature of the reaction chamber during the chemical and electrochemical reactions.

According to a configuration of the first aspect, the power source connected to the at least one first electrode and at least one second electrode is adapted to deliver a voltage ranging from 1 to 4V during the electrocoagulation reactions.

According to a configuration of the first aspect, the at least one first electrode and at least one second electrode are configured to operate as an anode and a cathode respectively.

According to a configuration of the first aspect, the at least one first electrode and at least one second electrode are sacrificial in nature and are selected from a group of metals such as Aluminum, to form metal hydroxides.

According to a configuration of the first aspect, the at least one first electrode and at least one second electrode are rectangular in shape.

According to a configuration of the first aspect, the inlet tube comprises a diffuser configured to disperse the $CO_2$ gas within the reaction chamber to form cavitation bubbles for $CO_2$ gas dissolution into the brine solution.

According to a configuration of the first aspect, the EC reactor comprises a vent tube positioned in the reaction chamber to release accumulated gases generated during the electrochemical reactions.

According to a configuration of the first aspect, the EC reactor comprises a mixing unit extending through at least a portion of the reaction chamber and at least partially submerged in the brine solution, wherein the mixing unit includes a magnetic stirrer, or a mechanical agitator.

According to a configuration of the first aspect, the EC reactor comprises a sealing cover on the reaction chamber to inhibit leakage of gases from the EC reactor.

A second aspect of the disclosure concerns a method of simultaneous capturing of $CO_2$ and brine desalination. The method comprises the steps of introducing a brine solution into a reaction chamber of an electrocoagulation (EC) reactor. Here, the EC reactor is equipped with at least one first electrode and at least one second electrode. The method further includes adding calcium oxide (CaO), and ammonium bicarbonate ($NH_4HCO_3$), to the brine solution to obtain a homogeneous solution. Further, an electric current is applied to the homogeneous solution to dissolve the at least one first electrode and at least one second electrode to generate solid coagulants. Furthermore, the method introduces a carbon dioxide ($CO_2$)-air gas mixture into the brine solution through an inlet tube to facilitate carbonation reactions resulting in capturing of $CO_2$ and then continuing the chemical reaction for 4-5 hours to form a solid precipitate of calcium carbonate ($CaCO_3$), magnesium carbonate ($MgCO_3$), sodium bicarbonate ($NaHCO_3$), and other salts. Lastly, the method obtains a desalinated brine solution by filtering the solid precipitate.

According to a configuration of the second aspect, the method includes optionally adding ammonium hydroxide ($NH_4OH$) to the brine solution.

According to a configuration of the second aspect, the at least one first electrode and at least one second electrode spacing ranges from 40-80 mm.

According to a configuration of the second aspect, the $CO_2$-air gas mixture is in the ratio of 1-15% $CO_2$ and balanced with ambient air.

According to a configuration of the second aspect, the method is carried out at a temperature range of 24° C. to 50° C.

According to a configuration of the second aspect, the addition of calcium oxide (CaO) increases pH and enables $CO_2$ capture by forming calcium carbonate and sodium bicarbonate.

According to a configuration of the second aspect, the ammonium bicarbonate enhances sodium bicarbonate recovery by shifting its solubility equilibrium towards precipitation.

According to a configuration of the second aspect, an electrocoagulation facilitates precipitation of ions such as sulfate, magnesium, and calcium, forming their respective hydroxides or sulfates.

According to a configuration of the second aspect, the temperature control is achieved by adjusting the applied voltage to prevent overheating and ensure optimal reaction kinetics.

According to a configuration of the second aspect, the coagulants formed during electrocoagulation enhance ion removal by creating complexes with residual brine ions.

According to a configuration of the second aspect, the solid precipitates are dried, weighed, and analyzed for their composition, including calcium carbonate, magnesium hydroxide, and sodium bicarbonate.

According to a configuration of the second aspect, the inlet tube ensures continuous $CO_2$ supply to promote steady carbonation reactions throughout the process.

According to a configuration of the second aspect, an ammonia stripping takes place by applying the electric current to generate gaseous ammonia facilitating bicarbonate precipitation and simultaneous capturing of $CO_2$ and brine desalination.

According to a configuration of the second aspect, the brine solution includes salinity levels more than 35,000 ppm.

EMBODIMENTS

The present disclosure also encompasses embodiments as defined in the following numbered phrases. It should be noted that these numbered embodiments intended to add to this disclosure and is not intended in any way to be limiting.

1. An electrocoagulation (EC) reactor, comprising: a reaction chamber being adapted to contain a brine solution with contaminants; an inlet tube positioned in the reaction chamber, the inlet tube being configured to supply carbon dioxide ($CO_2$) gas into the brine solution contained in the reaction chamber; and a plurality of electrodes, comprising at least one first electrode and at least one second electrode, positioned in the reaction chamber, such that at least a portion of the at least one first electrode and at least one second electrode is submerged in the brine solution, the at least one first electrode and at least one second electrode being connectable to a power source for delivering a voltage across the at least one first electrode and at least one second electrode to facilitate electrochemical reactions and electrocoagulation; wherein the electrocoagulation process precipitates dissolved salts and heavy metals in the brine solution reducing brine salinity and contaminant load while capturing $CO_2$ in the form of carbonates to form solid coagulants.
2. The EC reactor of embodiment 1, comprises a cooling chamber surrounding the reaction chamber, the cooling chamber being configured to contain a cooling fluid to regulate temperature of the reaction chamber during the chemical and electrochemical reactions.
3. The EC reactor of embodiment 1, wherein the power source connected to the at least one first electrode and at least one second electrode is adapted to deliver a voltage ranging from 1 to 4V during the electrocoagulation reactions.
4. The EC reactor of embodiment 1, wherein the at least one first electrode and at least one second electrode are configured to operate as an anode and a cathode respectively.
5. The EC reactor of embodiment 1, wherein the at least one first electrode and at least one second electrode are sacrificial in nature and are selected from a group of metals such as Aluminum, to form metal hydroxides.
6. The EC reactor of embodiment 1, wherein the at least one first electrode and at least one second electrode are rectangular in shape.
7. The EC reactor of embodiment 1, wherein the inlet tube comprises a diffuser configured to disperse the $CO_2$ gas within the reaction chamber to form cavitation bubbles for $CO_2$ gas dissolution into the brine solution.
8. The EC reactor of embodiment 1, further comprises a vent tube positioned in the reaction chamber to release accumulated gases generated during the electrochemical reactions.
9. The EC reactor of embodiment 1, comprises a mixing unit extending through at least a portion of the reaction chamber and at least partially submerged in the brine solution, wherein the mixing unit includes a magnetic stirrer, or a mechanical agitator.

10. The EC reactor of embodiment 1, comprises a sealing cover on the reaction chamber to inhibit leakage of gases from the EC reactor.

11. A method of simultaneous capturing of $CO_2$ and brine desalination comprising the steps of introducing a brine solution into a reaction chamber of an electrocoagulation (EC) reactor equipped with at least one first electrode and at least one second electrode; adding calcium oxide (CaO), and ammonium bicarbonate ($NH_4HCO_3$), to the brine solution to obtain a homogeneous solution; applying an electric current to the homogeneous solution to dissolve the at least one first electrode and at least one second electrode to generate solid coagulants; introducing a carbon dioxide ($CO_2$)-air gas mixture into the brine solution through an inlet tube to facilitate carbonation reactions resulting in capturing of $CO_2$ and then continuing the chemical reaction for 4-5 hours to form a solid precipitate of calcium carbonate ($CaCO_3$), magnesium carbonate ($MgCO_3$), sodium bicarbonate ($NaHCO_3$), and other salts; and obtaining a desalinated brine solution by filtering the solid precipitate.

12. The method of embodiment 11, wherein optionally ammonium hydroxide ($NH_4OH$) is added to the brine solution.

13. The method of embodiment 11, wherein the at least one first electrode and at least one second electrode spacing ranges from 40-80 mm.

14. The method of embodiment 11, wherein the $CO_2$-air gas mixture is in the ratio of 1-15% $CO_2$ and balanced with ambient air.

15. The method of embodiment 11, wherein the method is carried out at a temperature range of 24° C. to 50° C.

16. The method of embodiment 11, wherein the addition of calcium oxide (CaO) increases pH and enables $CO_2$ capture by forming calcium carbonate and sodium bicarbonate.

17. The method of embodiment 11, wherein the ammonium bicarbonate enhances sodium bicarbonate recovery by shifting its solubility equilibrium towards precipitation.

18. The method of embodiment 11, wherein an electrocoagulation facilitates precipitation of ions such as sulfate, magnesium, and calcium, forming their respective hydroxides or sulfates.

19. The method of embodiment 11, wherein the temperature control is achieved by adjusting the applied voltage to prevent overheating and ensure optimal reaction kinetics.

20. The method of embodiment 11, wherein the coagulants formed during electrocoagulation enhance ion removal by creating complexes with residual brine ions.

21. The method of embodiment 11, wherein the solid precipitates are dried, weighed, and analyzed for their composition, including calcium carbonate, magnesium hydroxide, and sodium bicarbonate.

22. The method of embodiment 11, wherein the inlet tube ensures continuous $CO_2$ supply to promote steady carbonation reactions throughout the process.

23. The method of embodiment 11, wherein an ammonia stripping takes place by applying the electric current to generate gaseous ammonia facilitating bicarbonate precipitation and simultaneous capturing of $CO_2$ and brine desalination.

24. The method of embodiment 11, wherein the brine solution includes salinity levels more than 35,000 ppm.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
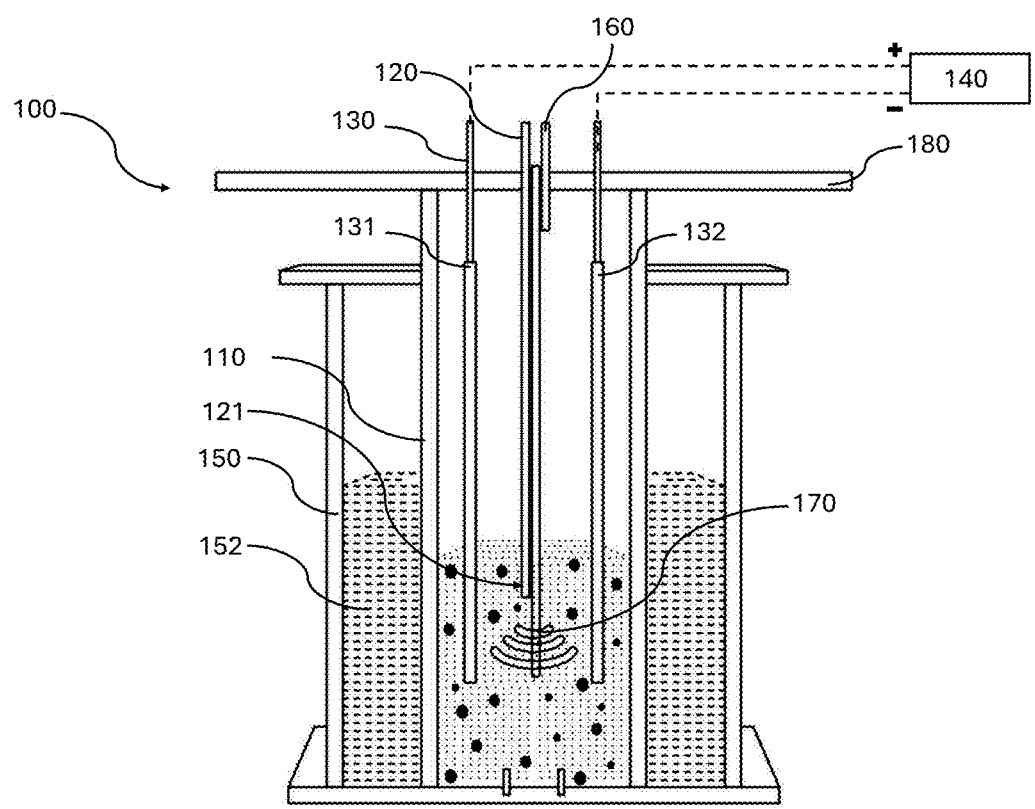
FIG. 1 illustrates an electrocoagulation (EC) reactor, according to an example of the present disclosure.

FIG. 1 illustrates an electrocoagulation (EC) reactor 100 [also referred to as the 'reactor 100' or 'EC reactor 100' hereinafter in the present disclosure], in accordance with an exemplary implementation of the present disclosure. The EC reactor 100 is configured to perform simultaneous $CO_2$ capture and brine desalination, incorporating chemical precipitation and electrocoagulation within a closed system. The EC reactor 100 operates by reducing brine salinity through the removal of dissolved salts and contaminants. At the same time, it captures $CO_2$ by chemically reacting the gas with components of the brine solution to form stable, insoluble carbonate compounds such as calcium carbonate ($CaCO_3$) and magnesium carbonate ($MgCO_3$). These carbonate compounds not only serve as a means of $CO_2$ sequestration but also represent potential resources for various industrial applications. By combining these processes in a compact and integrated system, the EC reactor 100 achieves significant advancement over traditional standalone methods, offering both environmental and operational benefits.

The EC reactor 100 comprises a reaction chamber 110 as depicted in FIG. 1. The reaction chamber 110 serves as a primary chamber to carry out chemical and electrochemical reactions. In one implementation, a longitudinal height of the EC reactor 100 is 135 mm, while the reaction chamber 110 has an internal diameter of 145 mm and a working volume of 1000 ml, optimized for accommodating brine solutions with contaminants. It should be noted that these dimensions are indicative and may vary depending on specific operational requirements, design constraints, or the nature of the contaminants being treated. The reaction chamber 110 is adapted to contain a brine solution with contaminants, such as dissolved salts and heavy metals. In one implementation, the brine solution is enriched with alkaline agents and chemical precipitation agents. These additives are introduced to promote reactions that reduce salinity and enable the capture of $CO_2$. By leveraging both electrochemical and chemical pathways, the reaction chamber 110 supports the formation of solid coagulants, including carbonate compounds like calcium carbonate and magnesium carbonate.

The EC reactor 100 further comprises a cooling chamber 150 surrounding the reaction chamber 110 and contains a cooling fluid 152. The cooling chamber 150 is configured to regulate the temperature of the reaction chamber 110 to prevent overheating during chemical and electrochemical reactions. In one implementation, the cooling fluid 152 filled in the cooling chamber 150 is water. In one implementation, the cooling chamber 150 is adapted to function as a temperature-controlled jacket. In one implementation the reaction chamber 110 and the cooling chamber 150 are vertical Plexiglas cylinders, providing durability and transparency for monitoring the process. This dual-chamber configuration i.e. the reaction chamber 110 and the cooling chamber 150 provides thermal stability, which is critical for reactions involving $CO_2$ and electrocoagulation process. Thermal stability ensures the proper kinetics of the reactions, prevents thermal degradation of materials, and sustains the efficiency of the overall process. The electrocoagulation process carried out within the reaction chamber 110 precipitates dissolved salts and heavy metals in the brine solution, reducing brine salinity and contaminant load of the brine solution. Simultaneously, it captures $CO_2$ by converting it into solid carbonates. These carbonates, along with other coagulants, are removed as solid precipitates, marking a dual achievement of brine desalination and $CO_2$ sequestration in an efficient and integrated manner.

Referring to FIG. 1 again, the EC reactor 100 also comprises a plurality of electrodes 130 positioned in the reaction chamber 110. In one implementation, the plurality of electrodes 130 comprises at least one first electrode 131 and at least one second electrode 132. The plurality of electrodes 130 are positioned in the reaction chamber 110 such that at least a portion of the at least one first electrode 131 and at least one second electrode 132 is submerged in the brine solution, ensuring direct interaction with the electrolyte for efficient electrochemical activity. The at least one first electrode 131 and at least one second electrode 132 are connectable to a power source 140 for delivering a voltage across the at least one first electrode 131 and at least one second electrode 132 to facilitate electrochemical reactions and electrocoagulation. In one implementation, the power source 140 connected to the at least one first electrode 131 and at least one second electrode 132 is adapted to deliver a voltage ranging from 1 to 4V during the electrocoagulation reactions.

In one implementation, the at least one first electrode 131 and at least one second electrode 132 are configured to operate as an anode and a cathode, respectively. This configuration creates a controlled electric field within the brine solution, enabling ion migration and facilitating the breakdown of contaminants. In one implementation, the at least one first electrode 131 and at least one second electrode 132 are sacrificial in nature, i.e. they dissolve during the electrocoagulation process, releasing coagulants such as metal ions into the solution. In one implementation, the at least one first electrode 131 and at least one second electrode 132 are selected from a group of metals such as Aluminum, to form metal hydroxides. In one implementation, the at least one first electrode 131 is configured to dissolve to generate solid coagulants. These coagulants react with dissolved impurities, forming insoluble hydroxides and other precipitates that can be readily removed. In one implementation, the at least one first electrode 131 and at least one second electrode 132 are inserted to the reaction chamber 110 with a spacing ranging from 40-80 mm, ensuring optimal ion migration for effective coagulation and precipitation processes. In one implementation, the at least one first electrode 131 and at least one second electrode 132 are rectangular is shape having a dimension of 55 mm in width, 135 mm in length, and 2.0 mm in thickness.

The EC reactor 100 is equipped with an inlet tube 120 positioned within the reaction chamber 110. The inlet tube 120 is configured to supply carbon dioxide ($CO_2$) gas mixture into the brine solution contained in the reaction chamber 110. In one implementation, the $CO_2$ gas mixture is in the ratio of 1-15% $CO_2$ and balanced with ambient air, which provides an optimal balance for initiating the carbonation reactions while maintaining cost-effectiveness. In one implementation, the inlet tube 120 ensures continuous supply of $CO_2$ to promote steady carbonation reactions throughout the process. This steady infusion of $CO_2$ is crucial for maintaining consistent reaction kinetics and ensuring the efficient conversion of $CO_2$ into solid carbonate compounds.

In one implementation, the inlet tube 120 includes a diffuser 121 adapted to disperse $CO_2$ gas mixture into the brine solution. The diffuser 121 is adapted to form cavitation bubbles within the brine solution. The diffuser 121 is adapted to enhance the dissolution of $CO_2$ gas mixture within the brine solution, promoting carbonation reactions and facilitating the precipitation of dissolved ions as carbonates. The generation of cavitation bubbles increases the surface area for gas-liquid interaction, allowing for more efficient carbonation reactions. As $CO_2$ dissolves into the brine solution, it reacts chemically with dissolved ions, promoting the precipitation of stable carbonate compounds such as calcium carbonate ($CaCO_3$) and magnesium carbonate ($MgCO_3$). In one implementation, the inlet tube 120 is extending to a bottom of the reaction chamber 110 ensuring that the $CO_2$ gas mixture is effectively introduced throughout the brine solution. This bottom-up distribution strategy enhances gas dispersion and ensures uniform reaction conditions within the reaction chamber 110. The $CO_2$ gas mixture dissolved into the brine solution is adapted to initiate a chemical reaction that promotes the formation of carbonates, such as calcium carbonate ($CaCO_3$), which precipitate out of the solution. The $CO_2$ mixture enhanced precipitation not only aids in the removal of contaminants but also serves as an efficient method of capturing and sequestering $CO_2$ in a solid form.

The EC reactor 100 further includes a mixing unit 170 to ensure optimal mixing and uniform velocity distribution across the at least one first electrode 131 and at least one second electrode 132. The mixing unit 170 is configured to promote optimal interaction between the brine solution, the $CO_2$ gas mixture, and the at least one first electrode 131 and at least one second electrode 132, enabling consistent reaction conditions throughout the reaction chamber 110. The mixing unit 170 extends centrally through at least a portion of the reaction chamber 110 and is at least partially submerged in the brine solution. In one implementation, the mixing unit 170 includes a magnetic stirrer or a mechanical agitator, to achieve effective agitation of the brine solution. These mechanisms facilitate the homogeneity of the solution, ensuring that the distribution of precipitation agents, dissolved $CO_2$, and contaminants is even across the reaction chamber. In one implementation, the mixing unit 170 rotates at 100-150 rpm, ensuring thorough mixing of the brine solution and precipitation agents with $CO_2$ gas mixture. The mixing unit 170 is adapted to eliminate any potential bulk circulation and enhances mass transfer, thereby improving the efficiency of both the $CO_2$ capture and brine desalination processes.

The EC reactor 100 further comprises a sealing cover 180 provided on the reaction chamber 110 to prevent leakage of gases from the EC reactor 100. In one implementation, the sealing cover 180 reinforced with a silicone wrap adapted to ensure that no gases escape from the EC reactor 100. Silicone, known for its flexibility and resistance to chemical degradation, ensures a tight seal around the reaction chamber 110. This feature is particularly crucial for preventing the escape of reactive or harmful gases, maintaining operational efficiency, and adhering to safety and environmental standards.

The sealing cover 180 is configured to seal the reaction chamber 110 to operate as a closed system, where the primary electrochemical and chemical reactions take place. This sealing cover 180 addresses critical operational requirements, including preventing gas leakage, maintaining a controlled environment for reactions, and ensuring the safety of the system. The closed system prevents external contaminants from entering and also ensures that gases involved in or generated during the process do not escape. The EC reactor 100 further comprises a vent tube 160 positioned within the reaction chamber 110 to release gases, such as hydrogen or oxygen, generated during the electrochemical reactions. The vent tube 160 prevents pressure buildup within the reaction chamber 110 and ensures safe operation of the EC reactor 100. In one implementation, the inlet tube 120 and the vent tube 160 extends from the sealing cover 180 of the EC reactor 100.

In one implementation, a method of simultaneous capturing of $CO_2$ and brine desalination to recover valuable products is now explained. The method as disclosed is adapted to integrate a conventional Solvay process, a modified Solvay process, and an Electrocoagulation (EC) process in a single operation within the EC reactor 100. The method can significantly improve desalination efficiency, especially when treating brine solution with high ion concentrations, paving the way for more sustainable and efficient desalination technologies.

Figure 2:
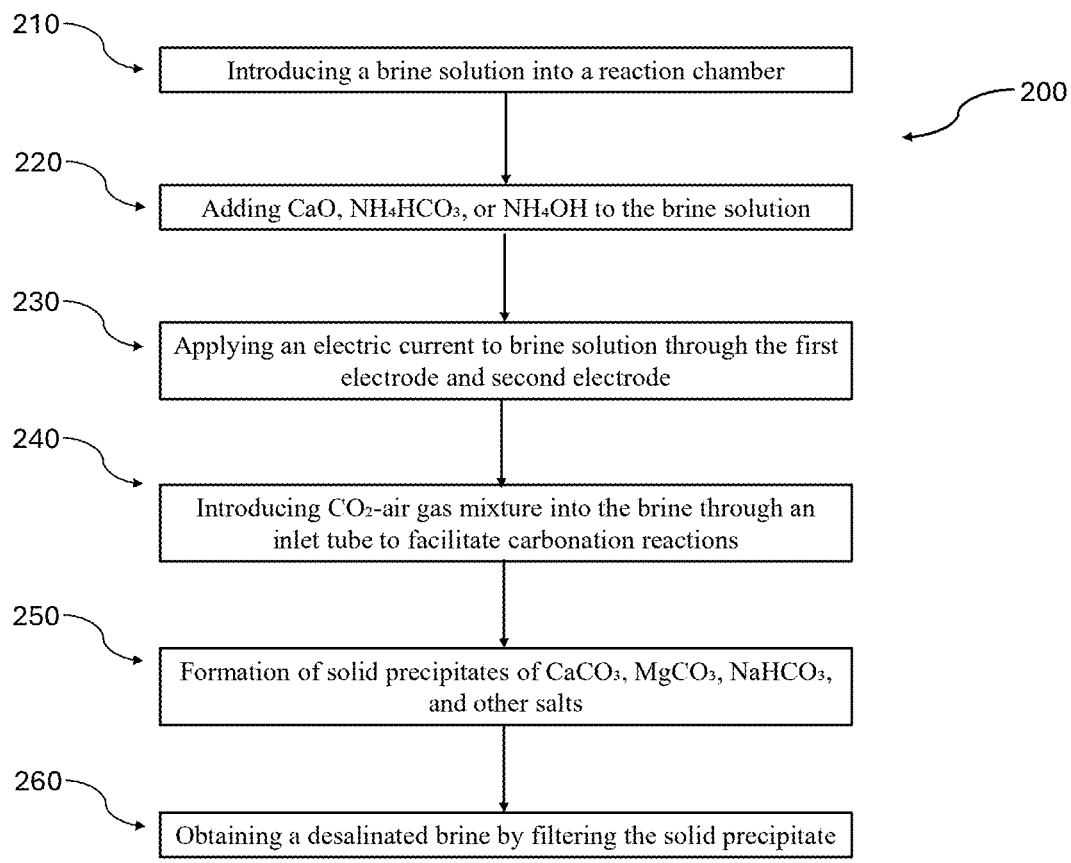
FIG. 2 illustrates a method of simultaneous capturing of $CO_2$ and brine desalination, in accordance with an example of the present disclosure.

Referring to FIG. 2, the method 200 comprises a first step 210 of introducing a brine solution into the reaction chamber 110 of the EC reactor 100. The EC reactor 100 is equipped with at least one first electrode 131 and at least one second electrode 132. In one implementation, the brine solution includes salinity levels more than 35,000 ppm. A second step 220 begins by adding calcium oxide (CaO) and ammonium bicarbonate ($NH_4HCO_3$) to the brine solution to obtain a homogeneous solution. In one implementation, ammonium hydroxide ($NH_4OH$) is optionally added to the brine solution. A third step 230 starts by applying the electric current from the power source 140 to the homogeneous solution by the at least one first electrode 131 and at least one second electrode 132 to initiate electrocoagulation process. Once the electrocoagulation process initiates, the process causes the dissolution of the at least one first electrode 131 and at least one second electrode 132 to generate solid coagulants. In one implementation, an ammonia stripping takes place by applying the electric current to generate gaseous ammonia, facilitating bicarbonate precipitation and simultaneous capturing of $CO_2$ and brine desalination. In one implementation, the electrocoagulation process facilitates precipitation of ions such as sulfate, magnesium, and calcium, forming their respective hydroxides or sulfates. In one implementation, the solid coagulants formed during electrocoagulation process enhance ion removal by creating complexes with residual brine ions.

In a fourth step 240, the inlet tube 120 introduces the $CO_2$ gas mixture into the brine solution to facilitate carbonation reactions. The method continues in a fifth step 250 by capturing the $CO_2$. In one implementation, the addition of calcium oxide (CaO) increases pH and enables $CO_2$ capture by forming calcium carbonate and sodium bicarbonate. In one implementation, the chemical reaction continues for 4-5 hours to form a solid precipitate of metal ions such as calcium carbonate ($CaCO_3$), magnesium carbonate ($MgCO_3$), sodium bicarbonate ($NaHCO_3$), and other salts from the brine solution. In one implementation, the ammonium bicarbonate enhances sodium bicarbonate recovery by shifting its solubility equilibrium towards precipitation. In one implementation, the temperature of the brine solution is recorded at 1-hour interval throughout the process, with the intermediate temperatures reaching up to 50° C. The high temperature is reduced by reducing the applied voltage to prevent overheating and ensure optimal reaction kinetics. In one implementation, the method is carried out at a temperature range of 24° C. to 50° C. Lastly, the method includes a sixth step 260 to obtain a desalinated brine by filtering the solid precipitate. In one implementation, after the completion of each run for 4 hours, the treated brine is filtered using a Buchner funnel filtration system. The solid coagulants and precipitates are collected, dried, and weighed and analyzed for their composition, including calcium carbonate, magnesium hydroxide, and sodium bicarbonate. The remaining liquid volume of the brine solution is also measured to quantify the amount of water recovered after treatment and ions content measurements.

In one implementation, Calcium oxide is introduced directly into the brine solution, where it transforms into calcium hydroxide upon contact. This increases the pH and captures $CO_2$ through its reaction with sodium chloride. According to the modified Solvay process, the reaction at this stage proceeds as follows:

$$2NaCl + 2CO_2 + Ca(OH)_2 \rightarrow CaCl_2 + 2NaHCO_3 \tag{1}$$

In one implementation, the brine solution reacts with ammonium hydroxide and $CO_2$, forming sodium bicarbonate and ammonium chloride. According to the conventional Solvay process, the reaction at this stage proceeds as follows:

$$NaCl + NH_4OH + CO_2 \rightarrow NaHCO_3 + NH_4Cl \tag{2}$$

In one implementation, Magnesium in the brine solution reacts with ammonia, yielding ammonium bicarbonate and magnesium hydroxide. This leads to an immediate reaction visible as a milky turbidity in the brine solution. The reaction proceeds as follows:

$$NH_3 + 2H_2O + MgCO_3 \rightarrow NH_4HCO_3 + Mg(OH)_2 \tag{3}$$

Simultaneously, the electrocoagulation process is initiated by passing the electric current through the at least one first electrode 131 and at least one second electrode 132 and generating the cathodic and anodic chemical reactions according to the chemical reactions given below:

The anode dissolution, which results in electrodes ions $M^{+n}_{(aq)}$:

$$M_{(s)} \rightarrow M^{+n}_{(aq)} + ne^- \tag{4}$$

Water electrolysis, which results in hydrogen gas and hydroxide ions:

$$2H_2O_{(aq)} + 2e^- \rightarrow H_{2(g)} + 2OH^- \tag{5}$$

The first step of the coagulant formation in its initial form:

$$M^{+n}{}_{(aq)}+OH^{-}{}_{(aq)} \rightarrow M(OH)_{2(s)} \tag{6}$$

The cathode electrode reaction during the electrocoagulation results in the formation of ammonia gas as shown in Equation (7), being the main process for the removal of ammonium ion ($NH^{4+}$):

$$2NH^{4+}+2e^{-} \rightarrow 2NH_{3(g)}+H_{2(g)} \tag{7}$$

For the sulfate removal, the ions formed in the anodic dissolution reaction according to Equation (4) $M^{+n}{}_{(aq)}$ promote the chemical precipitation and provide more driving force to precipitate the sulfate content as follows:

$$Ca(OH)_{2(s)}+M^{n+}{}_{(aq)}+Na_2SO_4 \rightarrow M(OH)_{n(s)}+CaSO_4 (s)+H_2O \tag{8}$$

In addition, a complex reaction through chemical precipitation by combining the aluminum hydroxide with other soluble ions during the electrocoagulation process is as follows:

$$Cations_{(aq)}+anions_{(aq)}+XAl(OH)_3+X(H_2O)_{(aq)} \rightarrow complex \cdot XAl(OH)_3X(H_2O) \tag{9}$$

Not all of the produced $NaHCO_3$ produced were collected as solids at the end thereof, where the high solubility of this component limited its precipitation even at high pH value and low temperature. However, this high solubility can be reversed by the addition of $NH_4HCO_3$. $NH_4HCO_3$ can be used in the modified Solvay process since it is a significant intermediate in the formation of $NaHCO_3$ and can enhance the efficiency of desalinating the reject brine. Raising the concentration of $NH_4HCO_3$ and hence increasing the concentration of ($HCO_3$—) would drive Reaction (11) towards higher $NaHCO_3$ recovery:

$$NH_4HCO_3(a) \leftrightarrow NH_4^{+}+HCO_3^{-} \tag{10}$$

$$NaHCO_3(a) \leftrightarrow Na^{+}+HCO_3^{-} \tag{11}$$

The methodology represents a significant advancement in the fields of brine desalination and $CO_2$ capture by integrating multiple complex processes into a streamlined, single-step operation. By addressing both challenges simultaneously, this approach enhances the efficiency of desalination, particularly for brine solution with high concentrations of dissolved ions. This paves the way for the development of more sustainable and cost-effective desalination technologies that minimize environmental impact while maximizing resource recovery.

To validate the effectiveness of this method, a series of controlled experiments were conducted to evaluate the simultaneous desalination of brine solution, $CO_2$ sequestration, and the recovery of solid precipitates through the electrocoagulation (EC) process. These experiments were performed within the closed configuration of the EC reactor 100, which was meticulously devised to optimize solution mixing and maintain precise temperature control throughout the operation. The controlled environment ensured that the chemical and electrochemical reactions proceeded efficiently, yielding valuable insights into the feasibility and scalability of this novel approach.

The methodology outlines a comprehensive approach to preparing brine solutions, incorporating chemical additives, and establishing the operating conditions for the electrocoagulation (EC) reactor. The brine samples used in the experiments were procured from a local desalination facility employing a reverse osmosis (RO) process. These samples represented reject brine solution with high salinity levels, ranging between 65,000 and 75,000 ppm, providing a challenging test case for the desalination and $CO_2$ capture process. The detailed characteristics of the reject brine solution were as follows:

pH: 9.14
Total Dissolved Solids (TDS): 72.9 g/L
Salinity: 71,650 ppm
Chemical Oxygen Demand (COD): 1,570 ppm
In terms of ionic composition:
Sodium (Na): 23,702 ppm
Magnesium (Mg): 2,784 ppm
Potassium (K): 749 ppm
Calcium (Ca): 1,365 ppm Additionally, trace metal analysis revealed that the concentrations of aluminum (Al), iron (Fe), manganese (Mn), lead (Pb), strontium (Sr), and zinc (Zn) were all below detectable limits, measured at 0 ppm.

This detailed characterization of the reject brine provided a robust basis for assessing the efficacy of the EC reactor in addressing high salinity levels and other complex chemical compositions. By leveraging these insights, the experimentation aimed to optimize the interaction of the brine solution with the chemical and electrochemical processes in the EC reactor 100, ensuring effective removal of contaminants, recovery of solid precipitates, and capture of $CO_2$.

The ammonium hydroxide (25 wt. % $NH_3$) and ammonium bicarbonate used in the work were procured from Scientific Progress Medical and Scientific Equipment, UAE. Additionally, a gas mixture consisting of 10% $CO_2$ and 90% air was supplied by Abu Dhabi Oxygen Company, UAE.

For each experimental trial, 500 mL of synthetic brine solution was introduced into the electrocoagulation (EC) reactor 100. The brine solution was then treated with varying quantities of calcium oxide (CaO) and ammonium bicarbonate ($NH_4HCO_3$), as outlined in Table 1, to explore their roles in enhancing the desalination and $CO_2$ capture processes. In certain experimental runs, ammonia ($NH_3$) was also incorporated into the brine composition to evaluate its specific contribution to $CO_2$ capture and the overall efficiency of solid precipitation. The systematic variation in the concentrations of CaO, ammonium bicarbonate, and ammonia was considered to investigate their respective influences on the performance of the EC process, particularly in terms of precipitate recovery and ion removal efficiency. Additionally, the experiments sought to analyze the effects of temperature and applied voltage on the recovery of solid precipitates and the efficiency of the electrochemical reactions. The reactor's internal temperature was carefully monitored and recorded at 1-hour intervals during the process to identify optimal operational conditions and ensure thermal stability.

The EC reactor 100 is equipped with two aluminum electrodes 130, which were connected to the power source 140 to deliver a controlled voltage. The voltage was adjusted within a range of 1.33 to 3.64 V, depending on the specific experimental conditions. The electrode spacing was maintained at 50 mm to promote efficient ion migration and facilitate coagulation and precipitation. This configuration was meant to ensure effective electrochemical reactions, promoting the removal of contaminants from the brine solution and enhancing the efficiency of $CO_2$ capture. In one implication, upon application of the electric current with the range of voltage 1.33 to 3.64 V the aluminum electrodes 130 dissolve to generate the solid coagulants. To enhance mixing and prevent gas accumulation, the inlet tube 120 was inserted into the reactor 100, allowing $CO_2$ to be continuously bubbled through the brine solution. This not only facilitated the carbonation of dissolved ions but also promoted the simultaneous chemical precipitation of metal ions from the brine solution and the capture of $CO_2$. The temperature was recorded within the range of 24° C. to 50° C., which varied depending on the applied voltage and the composition of the chemical additives. As the voltage was increased, the temperature tended to rise, reaching values between 40° C. and 50° C. To counteract the potential negative effects of high temperatures, the applied voltage was adjusted, which successfully reduced the reactor's temperature to a more optimal range of 24° C. to 39° C., ensuring that the electrochemical reactions proceeded efficiently without overheating the system. The experimental setup included varying combinations of chemical additives and applied voltages, which allowed for a thorough investigation of the effectiveness of the EC process in achieving both brine desalination and $CO_2$ capture.

By adjusting these factors, the study aimed to identify the optimal conditions that would maximize the recovery of solid precipitates and enhance the overall performance of the system in treating high-salinity brine solutions while simultaneously capturing $CO_2$.

Table 1 summarizes the key parameters and conditions for each experiment, including the total volume of brine solution, ammonia, amount of CaO and ammonium bicarbonate added, applied voltage, and temperature recordings.

TABLE 1

| Sample No. | Brine Volume (mL) | CaO Added (g) | Ammonium Bicarbonate (g) | Ammonia (mL) | Temperature (° C.) | Applied Voltage (V) | Brine volume After Filtration (mL) | Solid Recovered (g) |
|---|---|---|---|---|---|---|---|---|
| 1 | 500 | 0 | 0 | 0 | 30-36 | 2.65 | 489 | 12.699 |
| 2 | 500 | 10 | 0 | 0 | 38-50 | 3.64 | 292 | 45.900 |
| 3 | 500 | 10 | 5 | 0 | 34-36 | 2.65 | 337 | 38.00 |
| 4 | 500 | 0 | 5 | 0 | 34-38 | 2.66 | 362 | 26.618 |
| 5 | 500 | 0 | 5 | 50 | 24 | 1.33 | 480 | 15.473 |
| 6 | 500 | 10 | 5 | 50 | 26-34 | 1.69 | 450 | 54.942 |
| 7 | 500 | 10 | 0 | 50 | 31-35 | 2.00 | 393 | 47.2 |
| 8 | 500 | 0 | 0 | 50 | 26-33 | 2.00 | 442 | 17.2 |

The solid precipitates collected after each experiment were analyzed to determine the composition of the recovered materials.

Thermogravimetric Analysis (TGA) was employed to evaluate the thermal stability and composition of the precipitates formed during the electrocoagulation process. This technique provided valuable data on the mass loss and decomposition characteristics of the precipitates as they were heated, allowing for an understanding of their structural integrity and the temperature at which they began to break down. To further analyze the mineralogical and chemical composition of the precipitates, two complementary techniques were used: X-ray diffraction (XRD) and Fourier-transform infrared spectroscopy (FTIR). XRD was utilized to identify the crystalline structure of the precipitates, offering insights into the types of minerals formed, while FTIR provided detailed information on the functional groups present, revealing the chemical composition and potential bonding structures within the precipitates.

Additionally, Inductively Coupled Plasma Mass Spectrometry (ICP-MS) was employed to measure the concentrations of metal ions in the treated brine solution. This highly sensitive technique allowed for precise quantification of trace metal elements, helping to assess the efficiency of the electrocoagulation process in removing contaminants such as heavy metals. In parallel, the ammonia gas collected from the outlet tube during the process was directed into a separate collection system. Specifically, the gas was channeled into a tube containing 50 mL of deionized water, maintained at a controlled temperature. This step ensured that the ammonia was effectively captured and dissolved, and the resulting solution was then preserved for subsequent applications or further analysis, contributing to the overall study of $CO_2$ capture and brine treatment efficiency.

The efficiency of the electrocoagulation process in brine desalination, $CO_2$ capture, and solid recovery was evaluated based on several criteria:

Reduction in brine salinity: The reduction in brine salinity was assessed by measuring the conductivity of the treated brine before and after filtration.

$CO_2$ capture efficiency: The amount of $CO_2$ captured in each experiment was evaluated based on the volume of $CO_2$ gas introduced and the corresponding mass percentage of the formatted carbonates in the solid precipitates.

Solid recovery: The mass of the solid precipitates recovered after each run was recorded and compared across the different experimental conditions.

Before delving into the performance observations of the various experimental runs, it is important to clarify the methodology used for collecting and analyzing the precipitated solids. In this experimental study, the collected solids represent all the precipitates that were carried out of the electrocoagulation (EC) cell along with the treated brine solution. Notably, this collection excludes the solids that were deposited on the aluminum electrodes during the process. This procedural choice was made to optimize the experimental conditions by minimizing the accumulation of flocs and precipitated solids on the aluminum electrodes. The rationale behind this approach is twofold: first, to maximize the functionality and efficiency of the electrodes by preventing their surface from being obstructed by precipitates; and second, to reduce the frequency of electrode replacement or cleaning. By focusing on the solids that are removed with the brine solution, it is ensured that a more accurate assessment of the overall efficiency of the EC process while maintaining the electrodes in a more stable and effective operating condition. This strategy helps in selecting the optimal operational parameters that minimize the fouling of the electrodes, thereby enhancing the longevity and performance of the electrocoagulation system.

Sample 1—Control Experiment

In this baseline experiment, 500 mL of brine solution was treated without any chemical additives. The temperature ranged from 30° C. at the start to 36° C. by the end of the experiment, and a voltage of 2.65 V was applied throughout. The total volume of brine solution after adding chemicals (essentially none) was recorded at 437 mL, and the collected brine solution after treatment and filtration was 489 mL, with 12.70 g of solids recovered. Despite the lack of chemical agents, the experiment demonstrated some solid recovery, likely due to electrocoagulation alone. The insignificant reduction in brine volume indicates that minor precipitation occurred, although the magnesium removal efficiencies were modest. Sample 1 shows a moderate reduction in magnesium and a slight improvement in potassium, calcium and sodium removal. The overall solid recovery was 12.70 g, indicating some level of coagulant formation, but the low ion removal suggests further optimization is required.

Sample 2—Addition of CaO

In this experiment, 10 g of CaO was added to 500 mL of brine solution. The temperature initially rose to 50° C., reflecting the exothermic nature of the reactions, and then stabilized at 38° C. by reducing the applied voltage. A higher voltage of 3.64 V was used, which contributed to a notable solid recovery of 45.90 g. The brine volume decreased to 292 mL after treatment, indicating effective precipitation. The addition of CaO facilitated the formation of calcium-based precipitates, which enhanced solid recovery and contributed to the reduction of ion concentrations in the brine solution. Sample 2 shows excellent removal efficiencies for potassium, magnesium, and sodium, with substantial ion reductions. However, calcium concentration increased significantly, suggesting an interference in calcium precipitation. The solid recovery was 45.900 g, one of the higher yields, which correlates with the high ion removal efficiency for most ions except calcium.

Sample 3—Addition of CaO and Ammonium Bicarbonate

This experiment involved the addition of 10 g of CaO and 5 g of ammonium bicarbonate. The temperature stabilized around 36° C., and a voltage of 2.65 V was applied. The total volume of the brine collected after filtration was 337 mL, with 38.00 g of solids recovered. The presence of ammonium bicarbonate, along with CaO, likely promoted the formation of carbonate and bicarbonate ions, resulting in effective solid formation and precipitation. The ion removal efficiencies were moderate to high, indicating the combined chemical and electrochemical treatments were effective. Sample 3 demonstrates a good calcium removal efficiency along with significant magnesium and sodium reductions. Potassium removal is moderate but still notable. The solid recovery was 38.00 g, indicating effective solid precipitation with good ion removal performance, especially for calcium and magnesium.

Sample 4—Addition of Ammonium Bicarbonate Only

In this experiment, 5 g of ammonium bicarbonate was added to 500 mL of brine. The temperature ranged from 34° C. to 38° C., and a voltage of 2.66 V was applied. The total brine volume was recorded at 500 mL, with a decrease to 362 mL after filtration and 26.62 g of solids collected. The results indicate that while ammonium bicarbonate alone facilitated some precipitation, the solid recovery was lower compared to experiments involving CaO. The absence of CaO have limited the extent of precipitation, particularly for calcium-based compounds. Sample 4 shows excellent calcium and magnesium removal, with potassium and sodium removal efficiencies also achieving moderate levels. The solid recovery was 26.62 g, which is slightly lower than the others, but the high ion removal efficiencies for calcium and magnesium compensate for the lesser solid yield.

Sample 5—Addition of Ammonium Bicarbonate and Ammonia

In this experiment, 5 g of ammonium bicarbonate and 50 mL of ammonia were added to 500 mL of brine. The temperature was consistently at 24° C. throughout the experiment, and a lower voltage of 1.33 V was used. The total volume of brine after filtration was 480 mL of brine, with only 15.47 g of solids recovered. The low temperature and voltage might have contributed to lower solid recovery. The addition of ammonia did not appear to significantly enhance the precipitation process compared to other samples. Sample 5 achieves high calcium and magnesium removal, but the potassium removal is minimal. Sodium removal remains moderate. The solid recovery was 15.47 g, indicating lower solid formation compared to other samples, though calcium and magnesium are effectively precipitated.

Sample 6—Addition of CaO, Ammonium Bicarbonate, and Ammonia

This setup included 10 g of CaO, 50 g of ammonium bicarbonate, and 50 mL of ammonia. The temperature increased from 26° C. to 34° C. over the course of the experiment, with a voltage of 1.69 V applied. The total brine volume was 566 mL, with 450 mL collected after filtration and 54.94 g of solids recovered. The results indicate that the combination of CaO, ammonium bicarbonate, and ammonia was highly effective, leading to substantial solid formation and high ion removal efficiencies. The higher solid recovery suggests successful precipitation and filtration processes. Sample 6 performs excellently for potassium, magnesium, and sodium removal, with significant reductions across all ions. Calcium removal remains consistent with other samples at 84.85%. The solid recovery was 54.94 g, one of the highest, which is expected given the significant ion removal efficiencies.

Sample 7—Addition of CaO and Ammonia

In this experiment, 10 g of CaO and 5 mL of ammonia were added to 500 mL of brine. The temperature ranged from 31° C. to 35° C., and a voltage of 2.00 V was used. The total brine volume collected after filtration was 393 ml and 47.2 g of solids was recovered. The results show good solid recovery, with significant precipitation, likely enhanced by the combination of CaO and ammonia. The ion removal efficiencies were moderate, indicating effective precipitation and ion reduction. Sample 7 shows high calcium and magnesium removal efficiencies, but potassium removal remains minimal. Sodium removal is moderately effective. The solid recovery was 47.2 g, which is consistent with the removal efficiencies for calcium and magnesium, indicating successful coagulant formation.

Sample 8—Addition of Ammonia Only

In this final experiment, 50 mL of ammonia was added to 500 mL of brine. The temperature varied between 26° C. and 33° C., and a voltage of 2.00 V was applied. The total volume of brine after treatment was 442 mL and 17.2 g of solids was recovered after filtration. The results suggest that while ammonia contributed to some degree of precipitation, the overall solid recovery was lower compared to samples with additional chemical agents. The lower ion removal for potassium and sodium may indicate less effective precipitation under these conditions. Sample 8 shows good calcium and magnesium removal, though potassium and sodium removal are lower compared to other samples. The solid recovery was 17.2 g, suggesting that the solid precipitation process was less efficient compared to other runs, which might explain the lower ion removal for potassium and sodium.

Table 2 shows Ion's removal efficiency for the treated brine sample after the combined chemical precipitation and electrocoagulation process.

TABLE 2

| Sample No. | Ca Removal Efficiency (%) | K Removal Efficiency (%) | Mg Removal Efficiency (%) | Na Removal Efficiency (%) | $SO_4^{-2}$ Removal Efficiency (%) |
|---|---|---|---|---|---|
| 1 | 0.38 | 4.196 | 50.27 | 4.50 | 29.45 |
| 2 | −140.53 | 99.64 | 98.82 | 56.92 | 97.02 |
| 3 | 84.80 | 45.99 | 98.82 | 54.05 | 98.11 |
| 4 | 84.00 | 45.62 | 94.26 | 44.01 | 49.13 |
| 5 | 84.02 | 0.26 | 94.63 | 43.75 | 37.28 |
| 6 | 84.85 | 99.64 | 98.82 | 61.37 | 97.51 |
| 7 | 84.46 | 0.86 | 91.44 | 57.71 | 96.37 |
| 8 | 84.02 | 22.63 | 98.82 | 29.82 | 42.61 |

Sulfate removal efficiency varied significantly across the different stages, with the control experiment (Sample 1) showing the lowest removal at 29.45%, likely due to the absence of chemical additives. The addition of CaO in Sample 2 drastically improved sulfate removal to 97.02%, with further enhancement seen in Sample 3 (CaO and ammonium bicarbonate) at 98.11%. In contrast, sulfate removal dropped to 49.13% in Sample 4, where only ammonium bicarbonate was used, and fell further to 37.28% in Sample 5 (ammonium bicarbonate and ammonia). The combination of CaO, ammonium bicarbonate, and ammonia in Sample 6 resulted in one of the highest removal efficiencies at 97.51%, similar to Sample 7 (CaO and ammonia) at 96.37%. However, using only ammonia in Sample 8 led to a reduced sulfate removal efficiency of 42.61%. These results highlight that the presence of calcium-based compounds is crucial for effective sulfate removal.

After thorough analysis of the various experimental runs, it is clear that Sample 6 is the most effective configuration for the electrocoagulation (EC) process. The Sample 6 involved the addition of 10 g of CaO, 5 g of ammonium bicarbonate, and 50 mL of ammonia to the brine. The temperature during the experiment ranged from 26° C. to 34° C., and a voltage of 1.69 V was consistently applied. The total brine after filtration, 450 mL of brine was collected, resulting in a solid recovery of 54.94 g. This significant yield of solids indicates highly effective precipitation and filtration processes. The exceptional performance observed in Run 6 is further supported by its high ion removal efficiency. Significant reductions were noted for potassium, magnesium, and sodium, demonstrating the effectiveness of the chemical and electrochemical combination used. Although calcium removal was consistent at 84.85%, which is comparable to other effective runs, it was not the highest.

Nevertheless, the overall ion removal efficiency in Sample 6 was superior to that of the other experimental setups. Temperature management in Sample 6 was also well-executed, with the temperature being high enough to enhance reaction kinetics without adversely affecting the solubility of precipitates. This careful balance contributed to effective solid formation, avoiding the negative impacts often observed with higher temperatures. The combination of CaO, ammonium bicarbonate, and ammonia provided a synergistic effect that led to improved precipitation and higher solid recovery. Each chemical played a specific role: CaO facilitated the formation of calcium-based precipitates, ammonium bicarbonate contributed to the generation of carbonate and bicarbonate ions, and ammonia supported the overall reaction dynamics. In comparison to other runs, those with only CaO or ammonium bicarbonate demonstrated effective results but did not achieve the comprehensive performance seen in Run 6. The addition of ammonia in Run 6 enhanced the overall efficiency beyond what was achieved with single or dual chemical combinations. The control experiment and runs involving single chemicals showed lower solid recovery and ion removal efficiencies, highlighting the limited effectiveness of these configurations. In conclusion, Run 6 stands out as the most effective configuration for the EC process, evidenced by its high solid recovery, superior ion removal efficiencies, and optimal temperature management. This run represents the best choice for further scale-up and application in brine desalination and $CO_2$ capture processes, offering a robust and efficient solution for these challenges.

Figure 3:
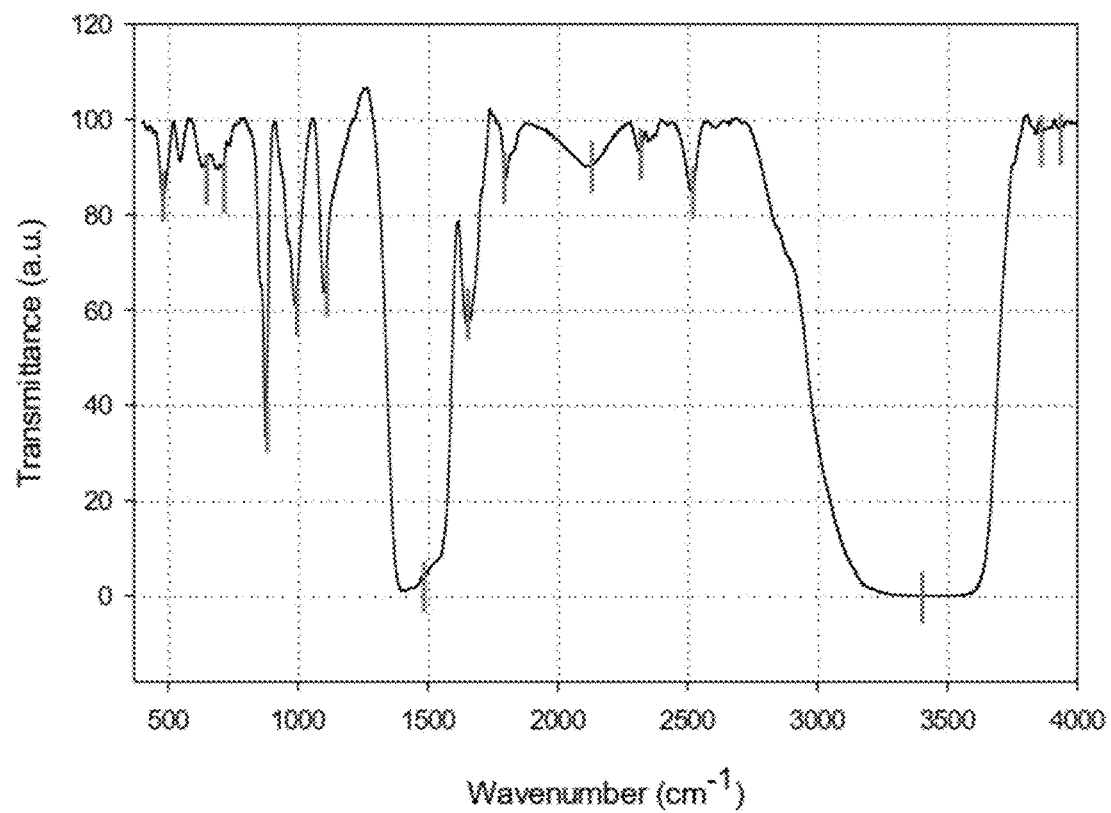
FIG. 3 illustrates an FTIR analysis of dried and collected solids of sample 6, in accordance with an example of the present disclosure.

Referring to FIG. 3, the FTIR analysis of the dried and collected solids from Sample 6 is presented. The analysis was conducted over a spectral range of 500-4000 cm$^{-1}$ with a resolution of 4 cm$^{-1}$ using 34 scans. As illustrated in FIG. 3, numerous absorption bands were identified, highlighting clear differences among the collected solid samples. Peaks corresponding to the OH$^-$ group were observed at wavenumbers between 3250 and 3750 cm$^{-1}$, while C—H stretching was detected in the 2750-3000 cm$^{-1}$ range. The carbonate group ($CO_3^{2-}$) was prominently observed at 1250-1750 cm$^{-1}$, and a peak indicative of the C—C group was noted between 800 and 1200 cm$^{-1}$.

Each sample exhibited a variety of components, but their concentrations varied. Sample 6 displayed the highest concentrations of sodium (Na) and other ions, including calcium (Ca), potassium (K), magnesium (Mg), sulfate ($SO_4^{2-}$), and carbon (C), compared to the other samples. This was clearly reflected in the FTIR data. Notably, the presence of sodium bicarbonate ($NaHCO_3$) in Sample 6 was confirmed by distinct peaks at 3718, 3428, 2889, and 1077 cm$^{-1}$, which closely matched the theoretical peaks for $NaHCO_3$. Furthermore, significant peaks at 1793, 1393, 873, and 712 cm$^{-1}$ confirmed the presence of calcium carbonate ($CaCO_3$). This analysis demonstrates that Sample 6 contained a notably higher concentration of these key components compared to the other samples, setting it apart as unique in its composition.

Figure 4:
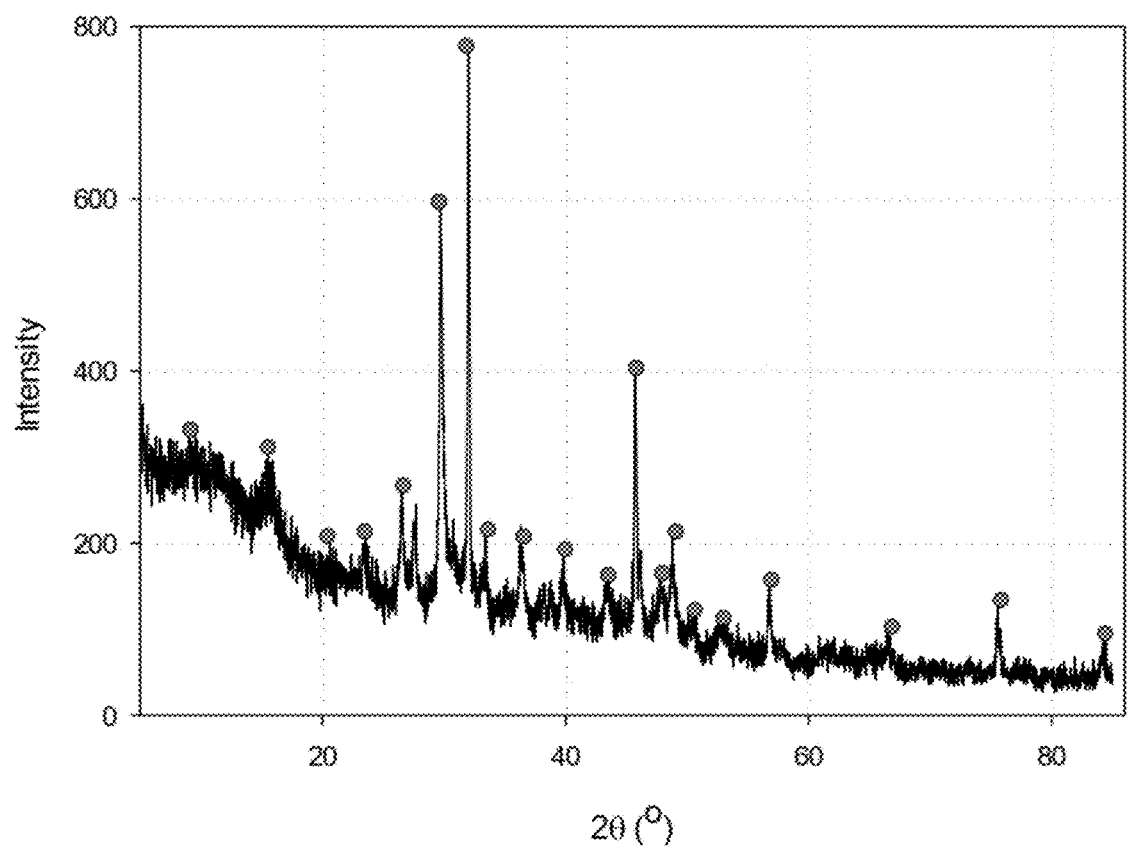
FIG. 4 illustrates an XRD analysis of dried and collected solids of sample 6, in accordance with an example of the present disclosure.

Referring to FIG. 4, the XRD analysis of the dried and collected solids from Sample 6 confirms the recovery of several key components using a single-step chemical precipitation and electrocoagulation (EC) process. Magnesium hydroxide (Brucite—$Mg(OH)_2$) was identified by distinct peaks at two-theta values of 18.59, 38.02, and 50.85. Additionally, sodium bicarbonate (Nahcolite—$NaHCO_3$) and calcium carbonate ($CaCO_3$) in both Vaterite and Calcite forms were detected, indicating successful removal of sodium and calcium ions from the brine.

The use of aluminum electrodes in the electrocoagulation process further facilitated the recovery of calcium sulfate (Anhydrite—$CaSO_4$), aluminum hydroxide, and Hydrocalumite ($Ca_3Al_2(OH)_3 \cdot xH_2O$). The final solids recovered from Sample 6 exhibited a strong presence of $NaHCO_3$ and $CaCO_3$, reflecting high concentrations of $Na^+$ and $Ca^{2+}$ ions. These results demonstrate the effectiveness of the modified Solvay process in achieving significant removal and precipitation of these components, leading to the successful recovery of sodium bicarbonate and calcium carbonate.

Figure 5:
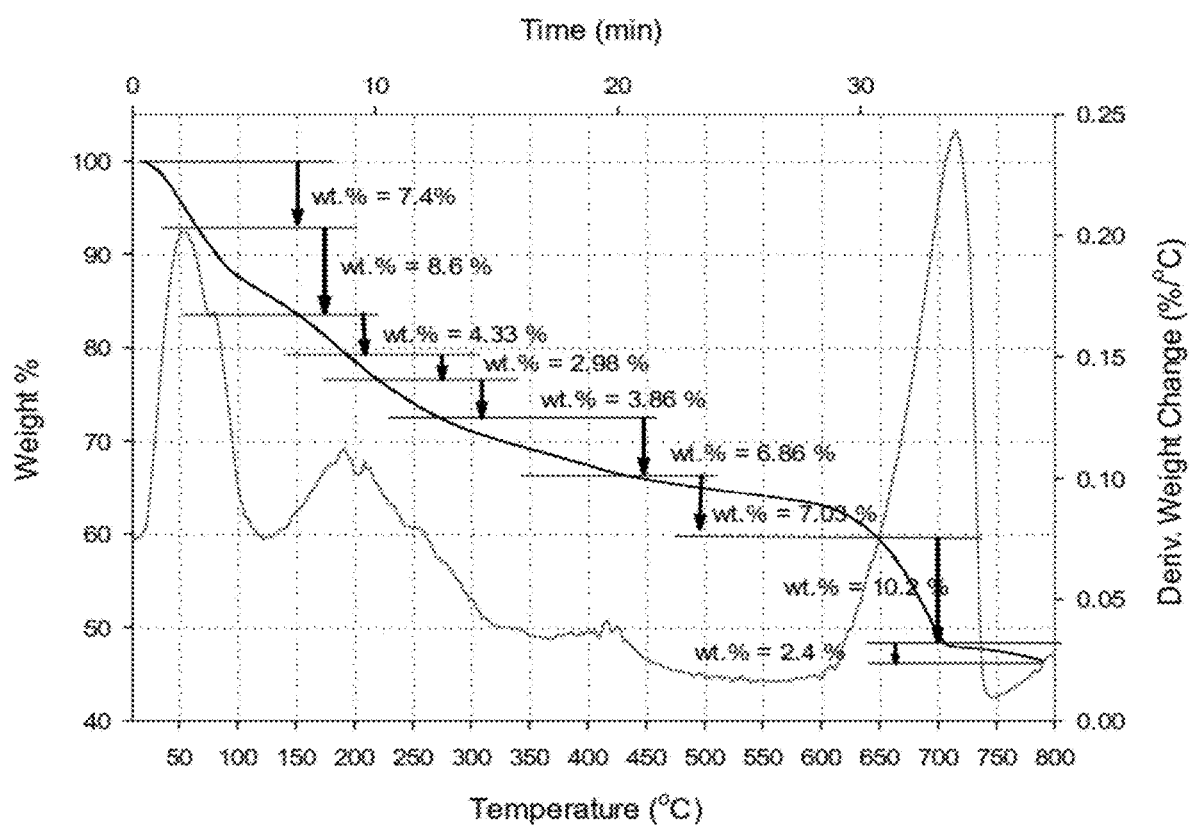
FIG. 5 illustrates a TGA analysis of dried and collected solids of sample 6, in accordance with an example of the present disclosure.
Figure 6A:
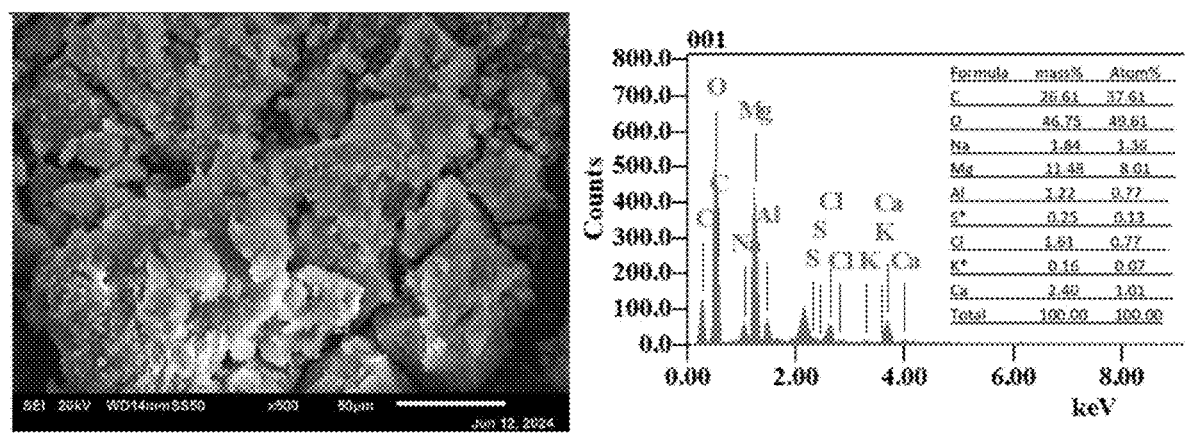
FIG. 6(a)-6(h) illustrates results from SEM and EDS analyses for the dried and collected solids from (a) S1, (b) S2, (c) S3, (d) S4, (e) S5, (f) S6, (g) S7, and (h) S8, in accordance with an example of the present disclosure.
Figure 6B:
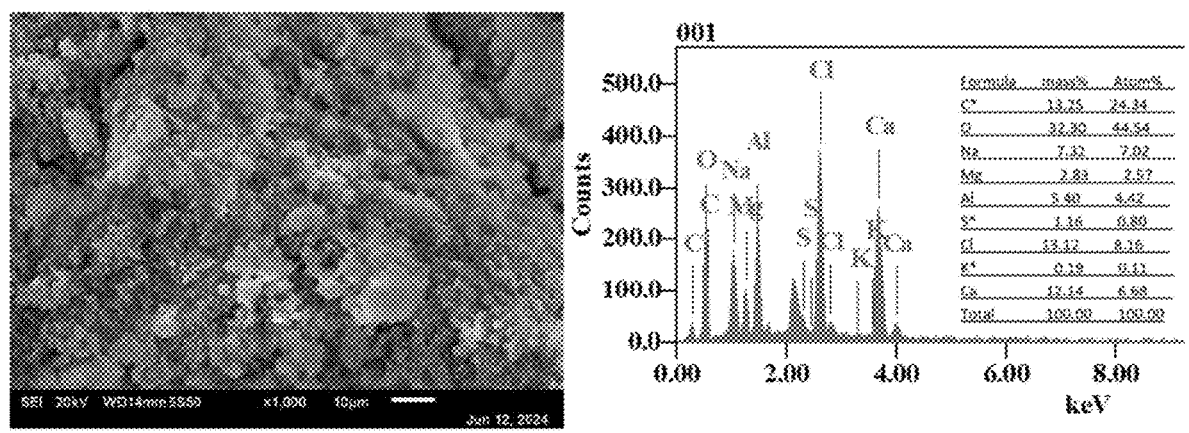
Figure 6C:
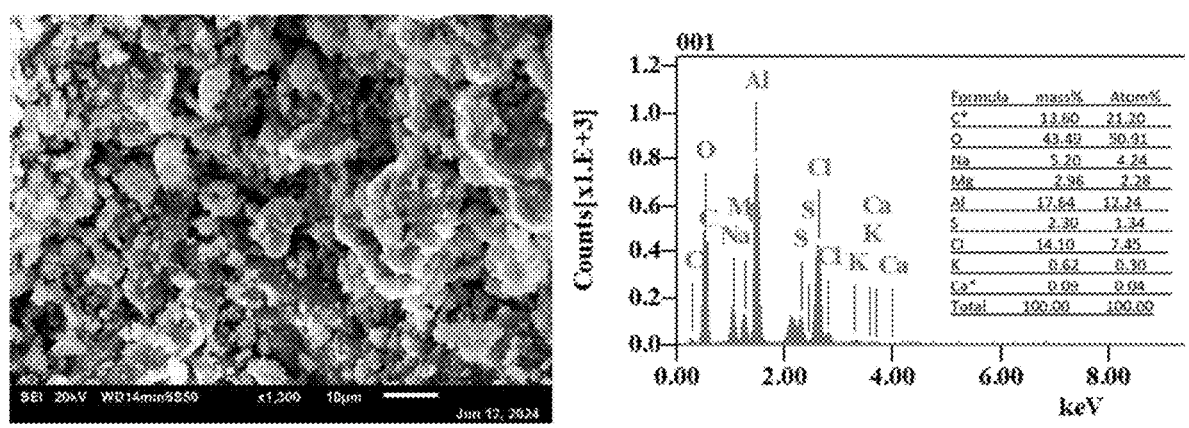
Figure 6D:
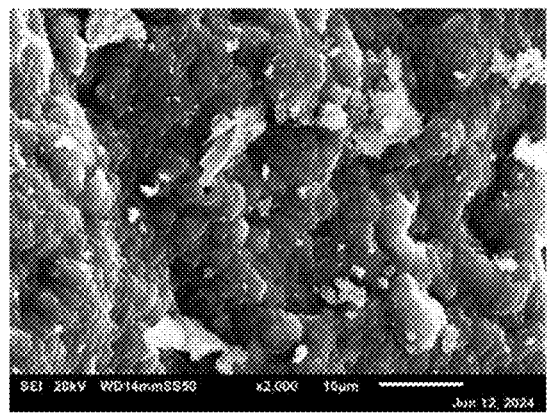
Figure 6D:
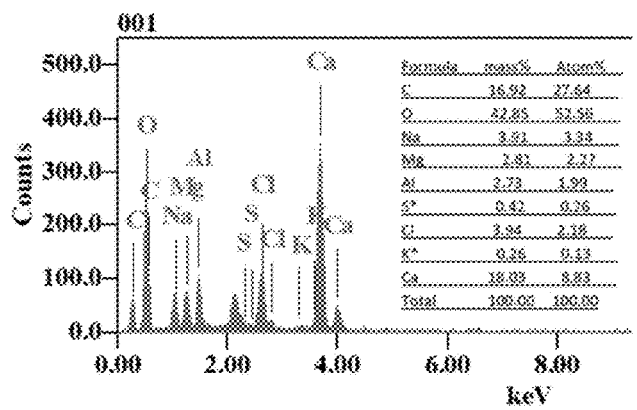
Figure 6E:
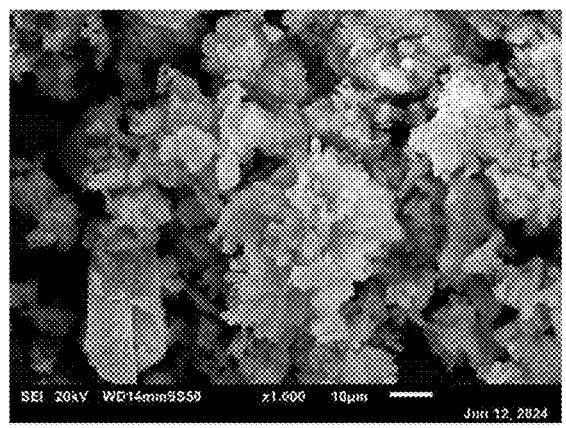
Figure 6E:
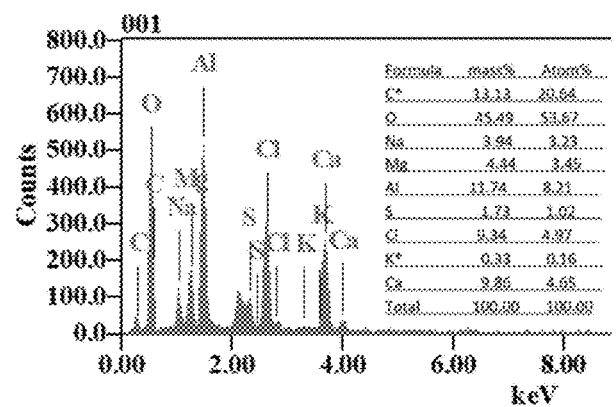
Figure 6F:
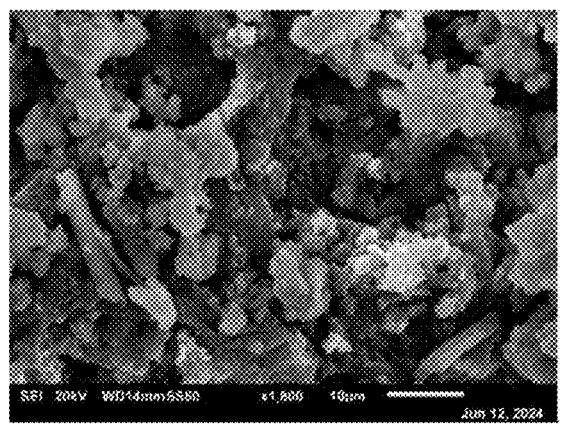
Figure 6F:
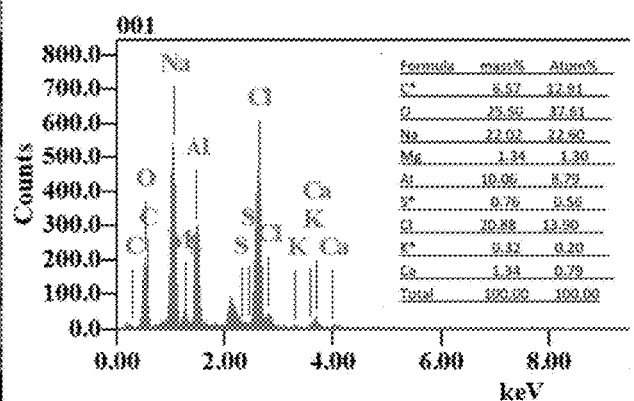
Figure 6G:
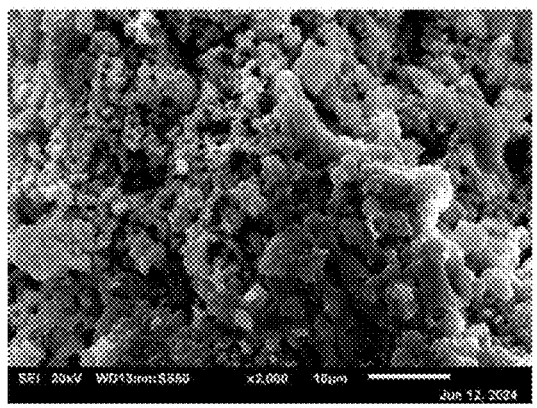
Figure 6G:
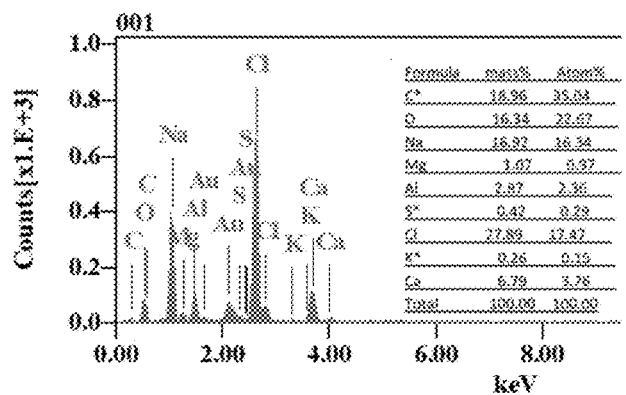
Figure 6H:
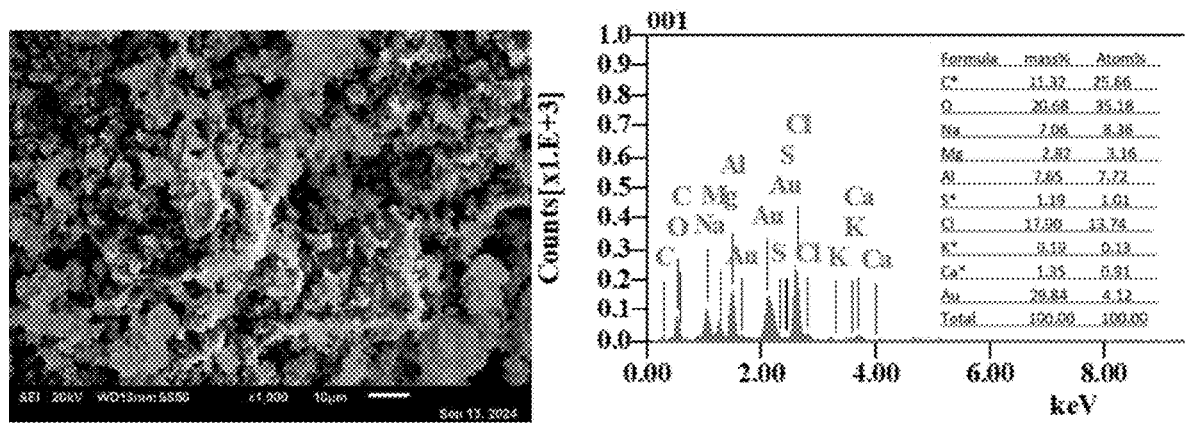

Referring to FIG. 5, the thermogravimetric analysis (TGA) of the dried and collected solids from Sample 6 revealed distinct stages of weight loss, which align with the findings from the FTIR and XRD analyses, without explicitly naming specific components. The initial weight loss (~20.33 wt %) below 200° C. was attributed to the evaporation of physically adsorbed water and the release of hydroxyl groups, as indicated by peaks in the FTIR analysis. A subsequent weight loss (~6.84 wt %) between 200° C. and 400° C. corresponded to the breakdown of bicarbonate and carbonate-related functional groups, as identified in the FTIR spectrum.

This was followed by a substantial weight loss (~24.09 wt %) between 400° C. and 700° C., primarily associated with the decomposition of more stable carbonate species and the release of gaseous byproducts. Beyond 700° C., minimal weight loss was observed, as most volatile components had already decomposed, leaving behind thermally stable oxides and potential hydroxide residues. These stages of weight loss, associated with the decomposition of functional groups, are consistent with the observations from the TGA, FTIR, and XRD analyses, confirming the transformation and removal of major functional groups during the thermal treatment process.

Referring to FIG. 6 (a)-(h), the SEM images and EDS analyses of the dried and collected solids are shown for samples (a) S1, (b) S2, (c) S3, (d) S4, (e) S5, (f) S6, (g) S7, and (h) S8, respectively. The solids, obtained through a single-step electrochemical coagulation (EC) and chemical precipitation process, were examined using scanning electron microscopy (SEM) to study their structure and external morphology. FIG. 6 illustrates the SEM images alongside energy dispersive spectroscopy (EDS) analyses for the fine, dried solid samples.

The SEM images reveal a variety of morphological structures. Plate- and needle-like morphologies were attributed to magnesium hydroxide ($Mg(OH)_2$), while elongated rod formations were associated with sodium bicarbonate ($NaHCO_3$). Spherical, framboid-like structures resembling raspberries were identified as calcium carbonate ($CaCO_3$). Distinct needle and lamellar structures, as well as rhombic crystals, were attributed to aluminum hydroxide and calcium sulfate compounds. The EDS analysis confirmed the presence of various ions, including $Cl^-$, $Ca^{2+}$, $Na^+$, and other key species. Shell-like and lamellar structures were linked to aluminum hydroxide, while rhombic formations were attributed to calcium-aluminum complexes, such as hydrocalumite and katoite.

The analysis consistently detected $NaHCO_3$ and $CaCO_3$ in various forms, with dominant spherical particles indicating high concentrations of these compounds in the final solids. Sample 6 exhibited the highest concentrations of sodium (Na) along with significant levels of calcium (Ca), potassium (K), magnesium (Mg), sulfate ($SO_4^{2-}$), and carbon (C). These concentrations were notably higher than those in the other samples. The dominant spherical particles and elongated rod formations in the SEM images of Sample 6 indicated the recovery of $NaHCO_3$, $CaCO_3$, and sulfate compounds in greater quantities. The EDS analysis further confirmed the presence of multiple ion species, highlighting Sample 6's remarkable efficiency in recovering key components.

Figure 7:
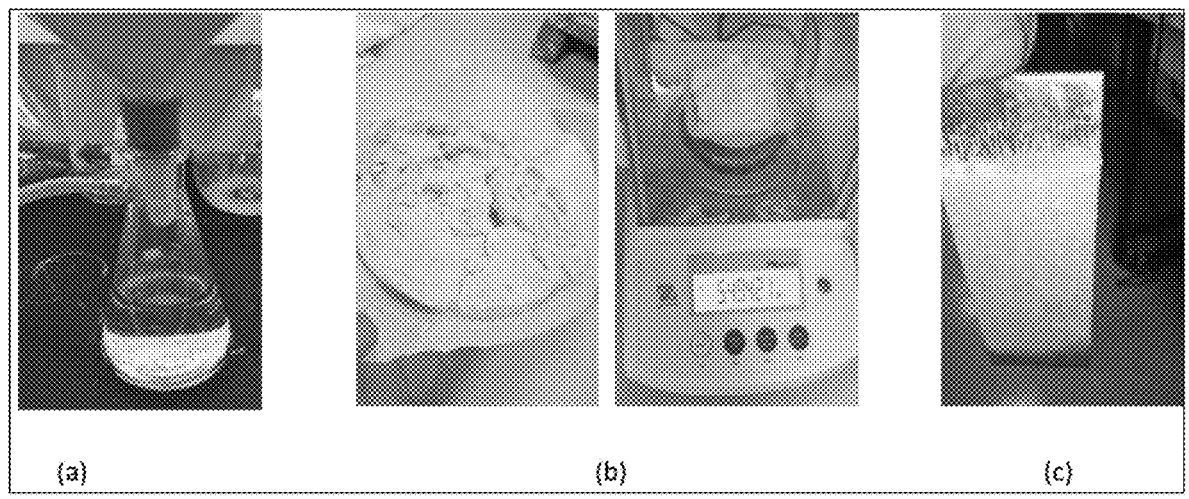
FIG. 7 illustrates photographs for the collected (a) treated brine solution and (b) solid sample (Number 6) and (c) the aluminum electrodes after using in the EC reactor, in accordance with an example of the present disclosure.

FIG. 7 provides visual documentation of key components from experiment number 6, offering a clear representation of the experimental outcomes. FIG. 7(a) displays the treated brine following the chemical and electrocoagulation (EC) treatment, showcasing a significant reduction in turbidity and the removal of suspended particles. The treated brine appears much clearer compared to its pre-treatment state, highlighting the effectiveness of the EC process in reducing particulate matter and improving the solution's clarity. FIG. 7(b) captures the solid sample collected from the brine after treatment, revealing a substantial recovery of solids. This image serves as evidence of the successful precipitation of ions during the EC process. The accumulation of solid precipitates within the sample demonstrates the efficient removal of dissolved ions, which were converted into solid phases, such as metal hydroxides or carbonates, as part of the brine desalination and $CO_2$ capture process.

FIG. 7(c) provides an image of the aluminum electrodes after their use in the EC reactor 100. The image clearly illustrates the physical changes and deposits that have accumulated on the electrode surfaces during the electrocoagulation process. These deposits, which are a result of the electrochemical reactions, include metal hydroxides and other coagulants formed as part of the treatment. The extent of these changes provides insight into the electrode wear and the overall effectiveness of the electrocoagulation process in facilitating ion precipitation. Together, these images in FIG. 7 offer a comprehensive visual assessment of the treatment process, showcasing both the improvements in brine quality and the successful recovery of solid materials from the brine solution. They serve as strong evidence of the EC process's efficiency in achieving both brine desalination and $CO_2$ capture.

The electrocoagulation (EC) reactor 100, and the associated method 200 for simultaneous $CO_2$ capture and brine desalination offer several notable advantages over traditional technologies, as well as some limitations that need to be addressed for broader applicability. The disclosed method integrates brine desalination and $CO_2$ capture into a single, unified process, which is a significant improvement over conventional methods that treat these challenges separately. This integration reduces operational complexity and improves system efficiency. The combination of electrocoagulation and chemical precipitation not only enhances the removal of contaminants from brine but also captures $CO_2$ more effectively. Precise control over parameters such as temperature, $CO_2$ injection, and electrochemical conditions further optimizes the process.

Cost-effectiveness is another major advantage of the present disclosure. By combining dual functionalities, the EC reactor 100 lowers the overall energy and material requirements, reducing operational costs compared to traditional standalone processes. Additionally, the process recovers valuable metal ions from brine and sequesters $CO_2$ in solid forms, such as carbonates, which can be used in industrial applications, creating potential economic benefits. From an environmental standpoint, this technology addresses two critical issues—brine management and $CO_2$ emissions—simultaneously, offering a sustainable solution with a reduced environmental footprint.

It is to be understood that the electrocoagulation (EC) reactor and the method of simultaneous capturing of $CO_2$ and brine desalination is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of simultaneous capturing of $CO_2$ and brine desalination comprising the steps of:
   a) introducing a brine solution into a reaction chamber of an electrocoagulation (EC) reactor equipped with at least a first electrode and a second electrode, wherein the brine solution contains dissolved Ca, Mg, and Na;
   b) adding calcium oxide (CaO) and ammonium bicarbonate ($NH_4HCO_3$), to the brine solution to obtain a homogeneous solution;
   c) applying an electric current to the homogeneous solution to dissolve the first electrode and the second electrode to generate solid coagulants by an electrocoagulation process;
   d) introducing a carbon dioxide ($CO_2$) gas mixture into the brine solution through an inlet tube to facilitate carbonation and capturing of the introduced $CO_2$ in the brine solution, and continuing the electrocoagulation process for 4-5 hours to form solid precipitates of calcium carbonate ($CaCO_3$), magnesium carbonate ($MgCO_3$), and sodium bicarbonate ($NaHCO_3$); and
   e) obtaining a desalinated brine solution by filtering the solid precipitate.

2. The method according to claim 1, wherein step b) further comprises adding ammonium hydroxide ($NH_4OH$) to the brine solution.

3. The method according to claim 1, wherein the spacing between the first electrode and the second electrode is in a range of from 40-80 mm.

4. The method according to claim 1, wherein the amount of the $CO_2$ gas mixture introduced into the brine solution is in a range of 1-15% $CO_2$ and the electrocoagulation process is carried out at a temperature range of 24° C. to 50° C.

5. The method according to claim 1, wherein the temperature range is achieved by adjusting the applied electric current.

6. The method according to claim 1, wherein the solid coagulants generated during the electrocoagulation process create complexes with residual ions in the brine solution.

7. The method according to claim 1, wherein the inlet tube ensures continuous $CO_2$ introduction to the brine solution to promote steady carbonation reactions of the introduced $CO_2$ throughout the electrocoagulation process.

8. The method according to claim 1, wherein applying the electric current to the homogeneous solution in step c) causes ammonia stripping to take place by generating gaseous ammonia, thereby facilitating bicarbonate precipitation and simultaneous capturing of $CO_2$ and brine desalination during the electrocoagulation process.

* * * * *